United States Patent [19]
Denton et al.

[11] Patent Number: 5,511,090
[45] Date of Patent: Apr. 23, 1996

[54] WIRELESS FREQUENCY-DIVISION-MULTIPLE-ACCESS DIRECT SEQUENCE SPREAD SPECTRUM TELEPHONE SYSTEM

[75] Inventors: D. Darryl Denton, Cupertino; Douglas Lau, Hillsborough, both of Calif.

[73] Assignee: Tatung Telecom Corporation, Mountain View, Calif.

[21] Appl. No.: 210,187

[22] Filed: Mar. 17, 1994

[51] Int. Cl.⁶ .................................................. H04B 15/00
[52] U.S. Cl. ........................... 375/205; 375/206; 375/207; 380/34; 379/61; 379/62; 455/89
[58] Field of Search ................................. 380/34; 379/61, 379/62; 455/89; 375/205, 206, 207

[56] References Cited

U.S. PATENT DOCUMENTS

| | | | |
|---|---|---|---|
| 5,258,995 | 11/1993 | Su et al. ......................................... | 375/1 |
| 5,335,249 | 8/1994 | Krueger et al. ........................... | 375/206 |
| 5,343,494 | 8/1994 | Averst et al. ................................ | 375/1 |
| 5,363,404 | 11/1994 | Kotzin et al. ........................... | 379/61 X |
| 5,375,140 | 12/1994 | Bustamante et al. ................... | 379/61 X |

OTHER PUBLICATIONS

CT2Plus Class 2: Specification for the Canadian Common Air Interface for Digital Cordless Telephony, Including Public Services, RSS–130 Annex 1, Issue 2, Radio Standards Specification, Effective Jan. 23, 1993.

CT2 PhoX™ Controller for Digital Cordless Telephones Am79C410, Advanced Micro Devices, pp. 1–40, Feb. 1993.

*Primary Examiner*—David C. Cain
*Attorney, Agent, or Firm*—Townsend and Townsend and Crew; Kenneth R. Allen

[57] ABSTRACT

A cordless, battery-operated telephone of relatively low power consumption suitable to operate in license-exempt spectrum and which may employ an established communication protocol, such as the CT-2 communication protocol, is realized by providing a direct sequence spread spectrum (DSSS) modulator/spreader and demodulator/despreader in a battery-operated handset in connection with an intelligent CT-2 controller to which is added additional circuitry and functionality in the handset for acquiring, pulling-in and tracking, in both operational and low-power-consumption standby modes, a received DSSS signal from a base station unit. The additional functionality in the handset includes a PN phase discriminator with intelligent oversampling to deal with the time division duplex signals during synchronization, a second order delay lock loop for in-service mode tracking at a moderate loop iteration rate, and an extended-range discriminator and very narrow-band third-order delay lock loop for stand-by mode tracking at a very low loop iteration rate.

18 Claims, 7 Drawing Sheets

WIRELESS FREQUENCY-DIVISION-MULTIPLE-ACCESS DIRECT SEQUENCE SPREAD SPECTRUM TELEPHONE SYSTEM

BACKGROUND OF THE INVENTION

This invention relates to cordless telephones, and in particular to digital cordless telephones using a form of spread spectrum communication between a wireless, battery-operated handset and a base station unit.

In selected frequency bands in the United States, wireless transmission is permitted without the need for license if certain standards of signal level and signal dispersion are satisfied. One such band is the Industrial, Scientific, Medical (ISM) Band (902 MHz–928 MHz). In recent years, the ISM band has become of interest for license-free voice and data applications as technology has advanced to take advantage of the availability and propagation characteristics of this band.

One possible technology which could satisfy the requirements of this band is direct sequence spread spectrum (DSSS). In this modulation technique, an information signal is modulated with a pseudo-random noise bit sequence to spread the information signal across a relatively broad spectrum. A digital code sequence can be used for example to modulate a phase shift keyed signal, spreading a narrow band (e.g., 20 kHz) signal over a channel of several Megahertz bandwidth.

Recently, the European Telecommunications Standards Institute has promulgated a standard for digital cordless telephone control and signalling called the Common Air Interface Second Generation Cordless Telephone-type digital signalling protocol. Commonly known as the CT-2 standard, it is designated I-ETS Interim Standard # I-ETS 300 131 of 1993. The CT-2 standard was originally devised to take advantage of available channels in the 864–868 MHz range with a data rate at 72 KPBS per FDMA channel. However, U.S. spectrum allocation standards require that a transmitter using fixed, narrow-frequency modulation techniques in that spectrum obtain an FCC license.

It is neither commercially desirable nor practical to obtain licenses for every cordless telephone in this country. Therefore, the CT-2 standard may not be a practical solution for second-generation cordless telephones in the U.S.A. and probably elsewhere.

Monolithic integrated circuit controller devices are available which accept/produce user input and output directly as voice and/or data and provide/accept digital input and output (serialized binary bit streams) which fully satisfy the CT-2 signalling and protocol standard. It has been presumed that the modulation employed with a CT-2 controller is of a relatively narrow-band digital format, such as Minimum Frequency Shift Keyed (FSK) modulation. These controllers are intended for example to be incorporated into battery-powered cordless handsets, together with a low-powered r.f. transceiver and digital modulator.

A CT-2 controller in integrated circuit form, such as a type Am79C410A controller (Advanced Micro Devices, Sunnyvale, Calif.), typically incorporates an embedded general purpose microcomputer. Upon investigation, it has been determined that such an embedded microcomputer is not fully utilized in its originally-intended application, although it has inadequate capability to handle complex signal processing functions in real time. Moreover, if the controller were in heavy use during "on-hook" idle time, the battery-powered handset would presumably discharge the battery at an unacceptably fast rate for typical applications.

What is needed is a cordless, battery-operated telephone which has relatively low power consumption and yet which is suitable to operate in license-exempt spectrum. It also would be advantageous to employ an established communication protocol.

SUMMARY OF THE INVENTION

According to the invention, a cordless, battery-operated telephone of relatively low power consumption suitable to operate in license-exempt spectrum and which employs an established communication protocol, namely, the CT-2 communication protocol, is realized by providing a direct sequence spread spectrum (DSSS) modulator/spreader and demodulator/despreader in a battery-operated handset in connection with an intelligent CT-2 controller to which is added additional circuitry and functionality in the handset for acquiring, pulling in and tracking (in both operational and low-power-consumption stand-by modes) a received DSSS signal from a base station unit. The additional functionality in the handset includes a pseudo-random noise (PN) phase discriminator with intelligent oversampling to deal with time division duplex signals during synchronization, a second-order delay lock loop for in-service mode tracking at a moderate loop iteration rate, and an extended-range discriminator and very narrow-band third-order delay lock loop for stand-by mode tracking at a very low loop iteration rate.

The invention will be better understood upon reference to the following detailed description in connection with the accompanying drawings.

DESCRIPTION OF THE PREFERRED EMBODIMENT

Figure 1A:
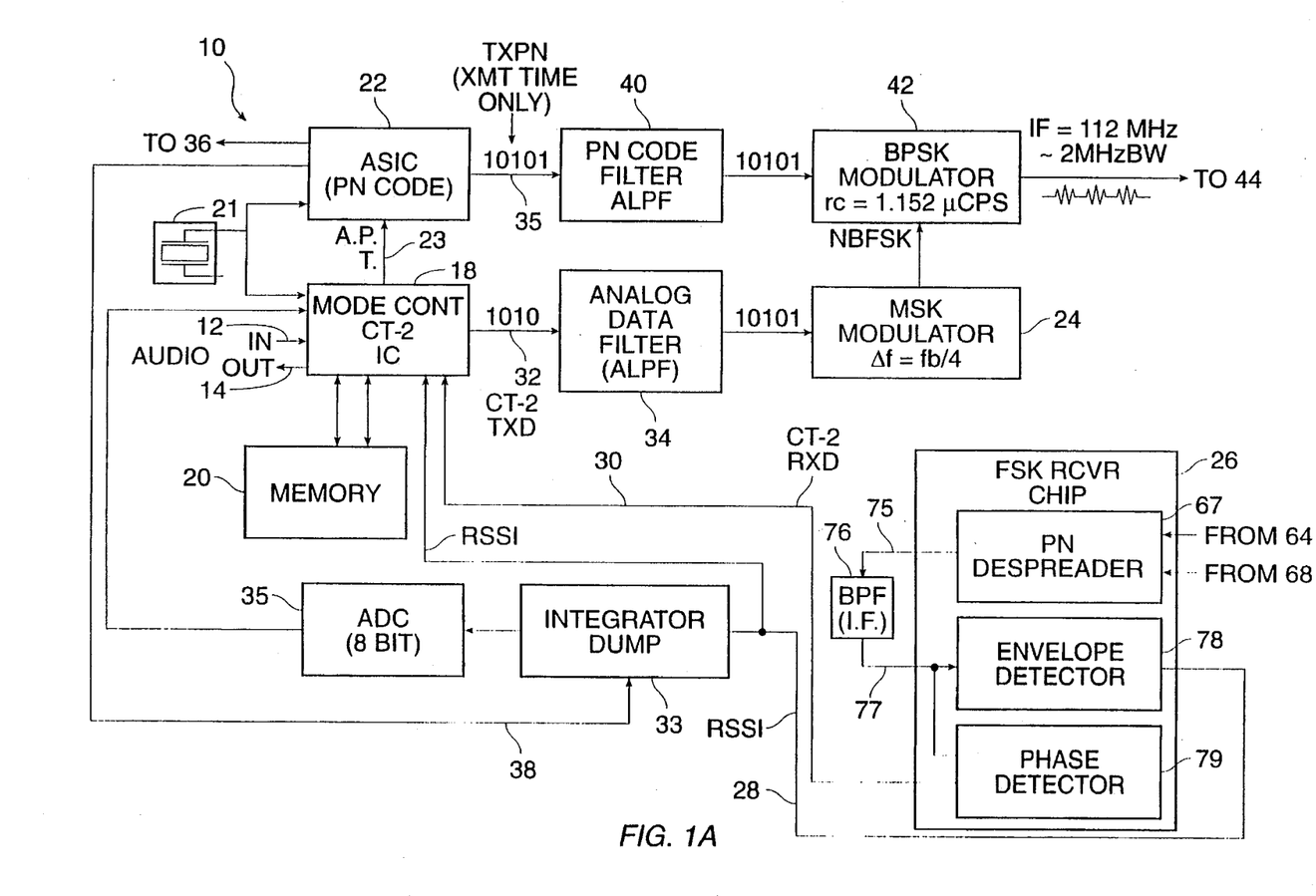
FIGS. 1A & 1B are a system block diagram of circuitry of a handset for a spread spectrum cordless telephone according to the invention.
Figure 1B:
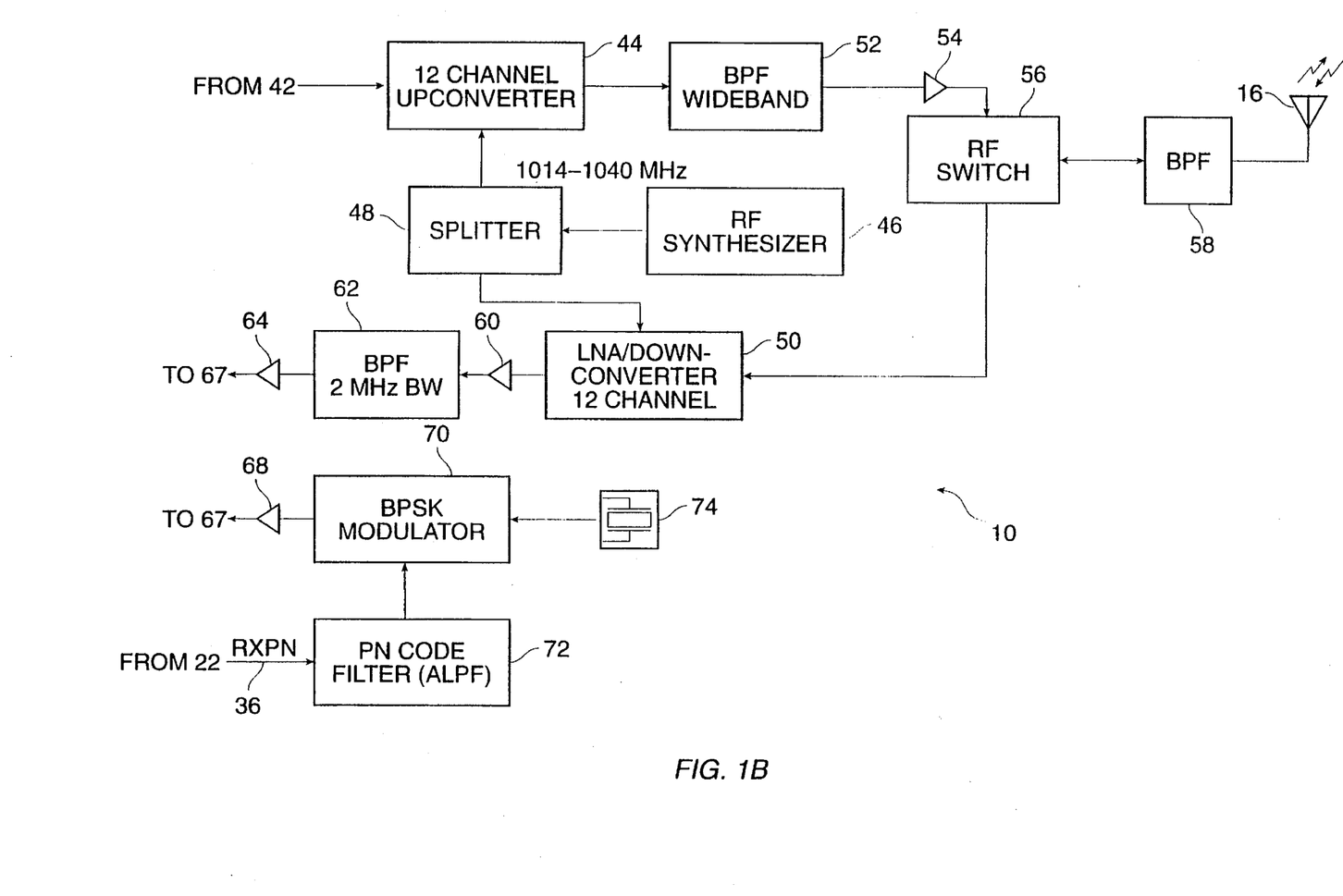

Referring to FIGS. 1A & 1B, there is shown a system block diagram of circuitry 10 of a handset (not shown) for a spread spectrum cordless telephone according to the invention. It is to be understood that there is a base station unit which includes complementary circuitry for processing the spread spectrum signals according to an established protocol, e.g., the CT-2 communication protocol. The handset 10 communicates audio signals via an audio input 12 and an audio output 14 through signal processing and modulation circuitry to and from an antenna 16 in wireless communication with a base station unit (not shown). It is understood that the base station unit can transmit and receive signals in accordance with the protocol and on the frequency channels used by the handset 10.

An integrated circuit capable of processing according to the established protocol, herein a CT-2 IC 18, has facilities for audio input and output, digital coupling to external digital memory 20 and to controlled devices and sensing devices. The controlled devices may include a customized ASIC 22, or the like, as hereinafter explained, and a digital signal modulator 24 for minimum frequency shift keyed modulation (FSK modulator 24). The CT-2 IC 18 and ASIC 22 are synchronized by a common oscillator 21 and the CT-2 IC 18 controls the mode of the ASIC 22, specifically the acquisition mode, the pull-in mode, and the tracking modes (A.P.T. 23), as hereinafter explained. The sensing devices include elements of an FSK receiver 26, including a receive signal strength indicator output (RSSI 28) and a received signal output detect (CT-2RXD 30).

In a specific embodiment, a digital transmit out signal (CT-2TXD 32) from the CT-2 IC 18 is coupled to an analog data filter (a lowpass filter) 34, which, as filtered, is applied to FSK modulator 24, which converts the digital data stream to a narrow-band FSK signal of for example 112 MHz i.f. frequency with relatively narrow-band frequency deviation, e.g., 18 kHz (±0.018 MHz). The ASIC 22 is a custom device whose purposes include generating a transmit pseudo-random noise (PN) code (signal on line TXPN 35) during a transmit cycle (frame) of a time division duplex (TDD) data stream, generating a receive PN code (signal on line RXPN 36) during a receive cycle (frame) of the TDD data stream, alternating in time with the transmit cycle and generating a dump signal on dump line 38 at a preselected dump rate of 9 kHz coupled to an analog integrator 33 operatively monitoring the RSSI 28 output signal, the output of which is fed back to the CT-2 IC 18 through an analog to digital converter (ADC) 35 for use in steering the phase of the RXPN 36 signal, which is a code as hereinafter explained.

In a preferred embodiment, the TXPN 34 signal is a code fed in digital form through a PN code filter 40 (an analog lowpass filter), which in turn is coupled, together with the output of the FSK modulator 24, to a code spreader, herein a BPSK modulator 42. Code is spread by the PN sequence by a factor of 16 in this embodiment, so that there are 16 chips per bit. Thus 128 chips of time constitute a single PN sequence for 8 bits of data. With an exemplary code rate of 1.152 Megachips per second (MCPS) the system produces a BPSK-modulated output at an i.f. frequency of 112 MHz spread over about 2 MHz. The signal is upconverted to one of typically twelve channels of 2 MHz-wide in a preselected frequency band, typically the ISM band (902–928 MHz), by a wideband upconverter 44, as specified by the frequency output of an r.f. synthesizer 46 (e.g., operating in a range of 1014–1040 MHz. A suitable device is a Motorola MRFIC2002). A splitter 48 is used to direct part of the analog output signal to a LNA/downconverter 50 used in conjunction with the receiver stage to process receive signals detected on the same frequency during the receive cycle of the TDD data stream. (A suitable LNA/downconverter is a Signetics NE600 device.)

The selected channel output of the upconverter 44 is supplied through a bandpass filter 52 to remove spurious images, thence through an r.f. amplifier 54 and r.f. switch 56 or hybrid, thence through a final bandpass filter 58 to the antenna 16. Received signals through the antenna 16 are directed by the r.f. switch 56 to the LNA/downconverter 50, which, under control of the r.f. synthesizer 46, downconverts the signal from its r.f. channel to the i.f. frequency (112 MHZ). A wideband amplifier 60, bandpass filter 62 and further wideband amplifier 64 direct the signal into FSK receiver 26. The FSK receiver 26 includes a despreader stage 67 which receives a despread signal input via an amplifier 68 from a BPSK modulator 70, which in turn receives a variable delay (variable phase) digital PN code input (RXPN 36) (filtered by an analog bandpass filter 72) which modulates output of a stable oscillator 74 (operating for example at 122.7000 MHz). The output of the despreader stage 67 is typically at a second i.f. frequency of 10.7 MHz with a bandwidth of 100 kHz. Unwanted side images are removed by a bandpass filter 76. The output 77 of BPF 76 is fed through the FSK receiver 26 to produce the CT-2RXD signal 30 and a received signal strength indication (RSSI) signal 30. Specifically, the output 75 of the despreader stage is fed through BPF 76 as an input 77 to an envelope detector 78 to produce the analog RSSI signal 28 which is used for error processing, as hereinafter explained, and the input 77 is also applied to a phase detector 79 to produce the received detected signal CT-2 RXD 30.

The receive signal at the antenna 16 must be reliably and quickly acquired, accurately pulled in and then tracked in various modes without causing undue energy consumption in the battery-powered unit. The ASIC 22, under control of the CT-2 IC 18, provides the needed control functions to steer the BPSK modulator with the variable RXPN code 36 signal input.

A suitable CT-2 IC 18 is a Type Am79C410A controller for Digital Cordless Telephones from Advanced Micro Devices of Sunnyvale, Calif. A suitable FSK receiver 26 is a Type MC13156 receiver chip from Motorola (headquartered in Schaumburg, Ill.) These devices incorporate many signal-handling functions, including intelligent processing capabilities and the demodulation and despreading functions used in connection with the signal processing according to the invention.

Figure 2:
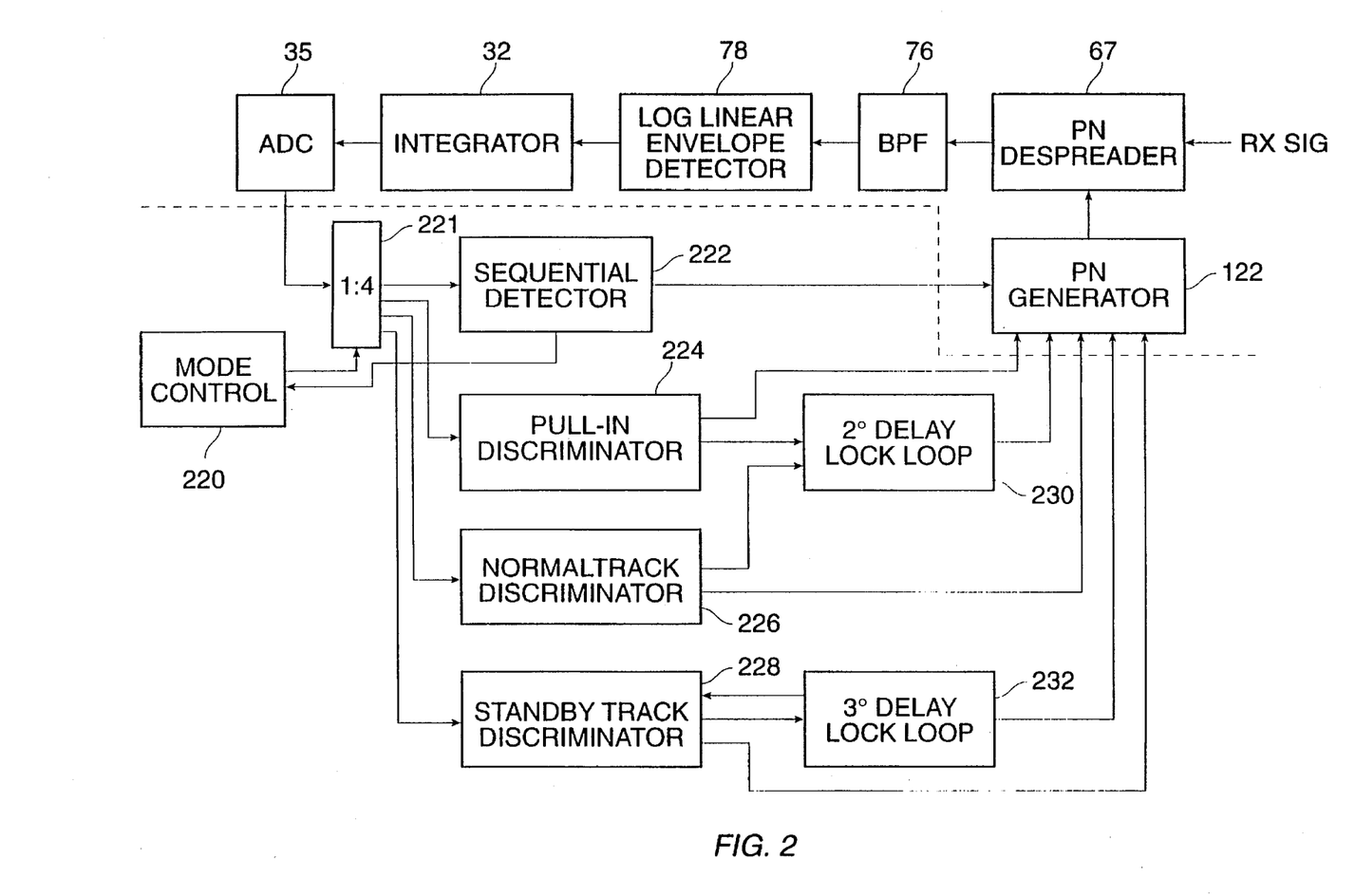
FIG. 2 is a functional block diagram of the acquisition, pull-in and tracking modes of operation of a handset according to the invention.

Referring to FIG. 2, there is depicted in a functional block diagram the operation of a discriminator comprising the CT-2 IC 18 and the ASIC 22 which produces the control outputs in accordance with the needed acquisition, pull-in and tracking functions of the invention. The Digital Cordless Telephone (DCT) signal is a spread-spectrum signal which is the product of a standard CT-2 signal and a 128-chip PN sequence. To acquire and track this signal, it is necessary to despread the signal, and as a residual of the despreading process, the standard CT-2 signal is recovered so it can be processed by a dedicated CT-2 processor in order to recover the encoded baseband signal. Functionally, the device operates in four modes: acquisition, pull-in, coarse tracking and fine tracking, and the device employs three types of digital lock loop discriminators: medium band (500 Hz @ 40 Hz bandwidth), low bandwidth normal (20 Hz @ 1 Hz BW), and ultra low bandwidth, low duty cycle (0.5 Hz @ 0.07 Hz BW).

Whenever a handset is powered on, it must acquire PN synchronization with a nearby base unit. It is contemplated that each base unit will always be transmitting at least one TDD signal, either a beacon signal with up to two voice signals or up to three voice signals, any one of which are suited for use in acquiring PN synchronization. The TDD signal is transmitted on any one of typically twelve different channels, so the receiver must be frequency agile. Once PN synchronization is acquired, the normal CT-2 circuitry is used to acquire and maintain CT-2 data synchronization.

Figure 4:
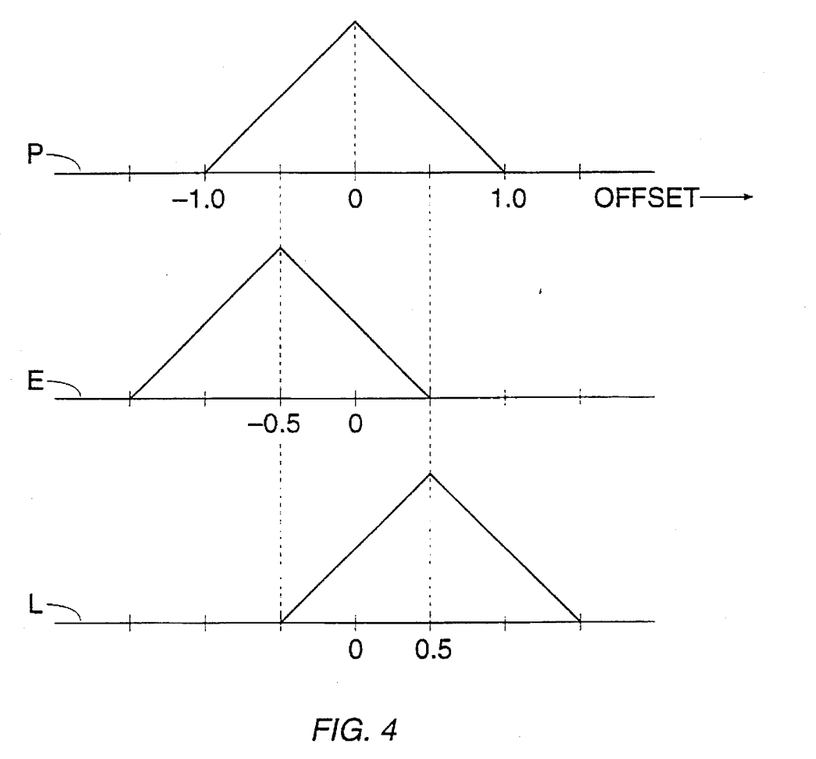
FIG. 4 is a depiction of three typical correlation characteristics of RSSI signals.

To acquire PN synchronization, a PN generator 122 of the ASIC 22 generates a receive PN code RXPN having a phase control input 123 wherein the phase is adjusted by various control mechanisms, as herein explained. The PN code, when multiplied by the received signal in PN despreader 67, filtered in BPF 76 and processed through log linear envelope detector 78, yields the RSSI signal, whose characteristic is shown is shown in three related traces in FIG. 4 as a function of the offset in chips between the local reference PN phase and that of the received signal. The analog RSSI signal is integrated over approximately one PN sequence length in integrator 33 and converted to a digital form by ADC 35 (FIG. 1A). Trace P, FIG. 4, shows the RSSI characteristic of the PN autocorrelation function in the vicinity of its peak at zero PN phase offset; trace E, FIG. 4, shows the same characteristic, but with the RSSI measurement being made at a PN phase offset dT early relative to the reference PN phase; trace L, FIG. 4, shows the same characteristic, but with the RSSI measurement being made at a PN phase offset dT late relative to the reference PN phase (dT=½ chip in this example).

As shown in FIG. 2, the digital output of ADC 35 is used by the CT-2 IC 18 operating under programmed instructions in a variety of ways to accomplish acquisition, pull-in, and tracking of the TDD DSSS signal. (The equivalent of a multiplexer 221 under a mode control 220 selects the mode of operation.)

During initial acquisition, this program implements a sequential detector function 222 as detailed in Table I showing pseudo-code equivalent to source code which may be used in a specific embodiment.

TABLE I

Sequential Detector Logic

PROCEDURE Search ()
FOR k = 1, Nfreq DO
  set synthesizer to freq(k);
  Scan (36,17,10);
  IF dmax < threshold NEXT;
  N = 6*(jmax-1) + imax + 5–10;
  Adv (N mod 256);
  Scan (3,10,10);
  IF dmax < threshold NEXT;
  N = imax + 0–10;
  Adv (N mod 256);
END
PROCEDURE Scan (k1,k2,k3)
WNI; RHC; dmax = 0;
FOR j = k1, 1, –1 DO
  WNI; RHC; m2 = RSSI;
  FOR j = k2, 1, –1 DO
    WNI; RHC; m1 = RSSI;
    d = m1 + m2; m2 = m1;
    IF d > dmax, {dmax = d; imax = i; jmax = j };
    IF i == 2, Adv (k3);
  END
where TABLE I-continued Sequential Detector Logic PROCEDURE WNI      waits for next interrupt
PROCEDURE RHC      retards local PN phase by 1/2 chip
PROCEDURE Adv(m)   advances local PN phase by m/2 chips.

This function, for each of up to 12 channel frequencies, scans the entire PN phase uncertainty domain (128 chips in the preferred embodiment), reading the RSSI measurement at successive PN phase offsets spaced at half-chip intervals to determine the phase at which the RSSI is a maximum.

If the maximum is not above a specified threshold, the search process is repeated on the next channel frequency; otherwise the local PN phase is slewed back to a point 5 half-chips in advance of the phase of the maximum RSSI measurement and a second, narrower scan is conducted. If the maximum RSSI measurement from this scan also exceeds the threshold, signal presence is declared and signal pull-in and tracking are initiated from the PN phase corresponding to the RSSI maximum within the narrower scan.

The second scan both verifies the results of the first scan and accounts for any clock drift between the handset and the base station during the time between the first and second scans (up to 72 msec in the preferred embodiment).

Due to the TDD structure of the signal, and since the handset has no knowledge of time or TDD phasing when it is first switched on, each scan is constructed so as to take at lease two RSSI measurements at each half-chip PN phase uncertainty state in a pattern guaranteed to cover the base station transmit period completely, regardless of the TDD phasing. Specifically, the initial scan pattern is as in Table II, where each digit or letter represents one of the 256 half-chip PN phase uncertainty states to be examined.

TABLE II

```
                                                    Retard →
0 1 2 3 4 5 6 7 8 9 A B C   D   E F G H
            7 8 9 A B C     D   E F G H I J K L M N O
                                E F G H I J K L M N O P Q R S T U V
    ← advance                               L M N O P Q R ... etc.
                            "D"
```

This is a seven, ½-chip retrace sequence allowing for determination of code phase offset of an incoming TDD signal which is not always present.

Assuming the peak RSSI measurement is determined to be at state "D", for example, the verification scan pattern would be:

```
                        8 9 A B C D E F G H I
                        8 9 A B C D E F G H I
                        8 9 A B C D E F G H I
```

For purposes of peak determination, the measurement at each phase is actually a window-of-2 sum of the RSSI reading at that phase and the reading at the phase ½ chip later.

Once the PN signal is initially acquired, i.e. once the local PN phase has been aligned with the received signal PN phase to within ½ chip or so, a pull-in and tracking process is initiated which aligns and maintains the phases to within ½ chip. This process includes three different PN phase discriminators 224, 226, and 228, and two delay lock loops 230 and 232 (FIG. 2).

Figure 8:
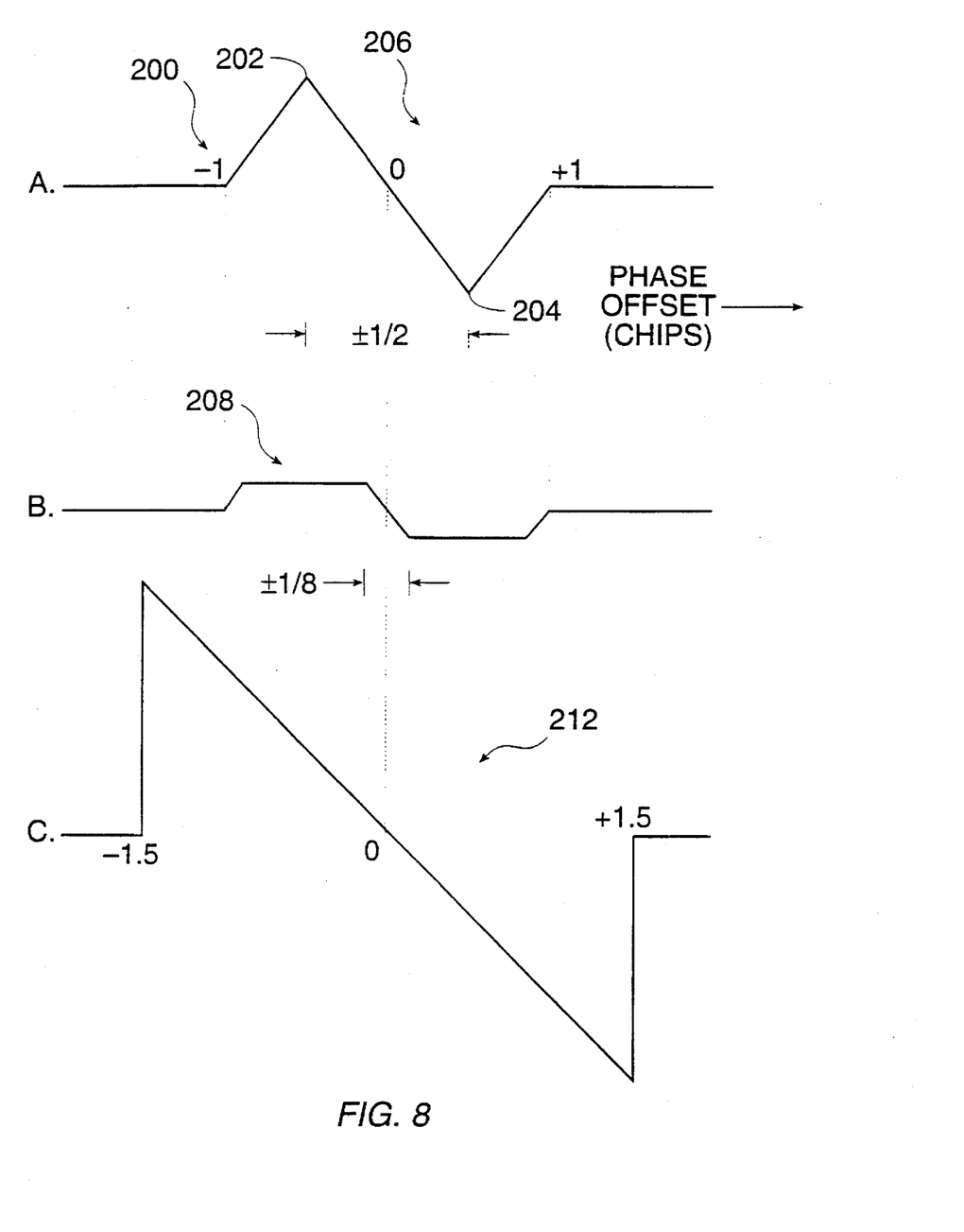
FIG. 8 is a depiction of the discriminator characteristics of a low-sampling rate third-order delay lock loop.

FIG. 8, trace A, shows the discriminator function given by the difference between FIG. 4 trace E and trace L. FIG. 8, trace B, shows the effect of instead selecting dT=⅛ chip. In the preferred embodiment, Early and late (E,L) measurements (RSSI measurements taken dT early and dT late relative to the reference PN phase) are taken with dT=⅛ chip in both the pull-in and normal tracking modes, and with dT=½ chip in the standby tracking mode.

Figure 5:
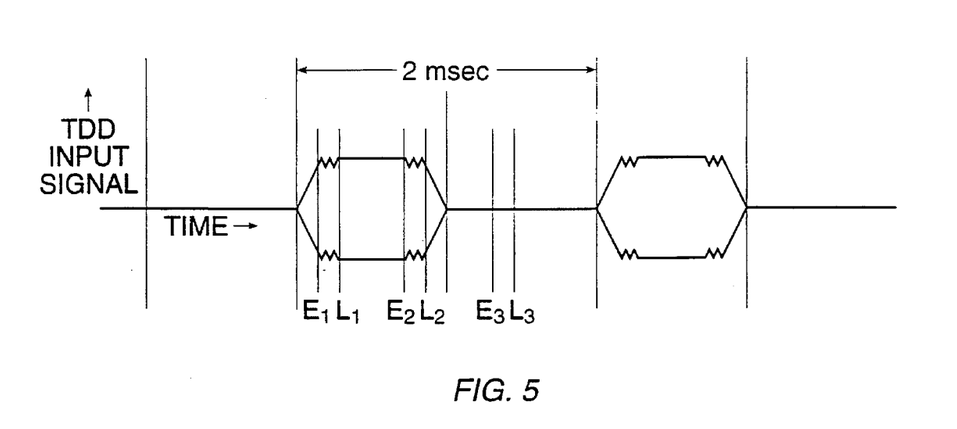
FIG. 5 is a timing diagram of intelligent oversampling at typical intervals of a frame.

Referring to FIG. 5, the normal mode PN phase discriminator 226 (FIG. 2) takes a single (E,L) measurement pair once each 2-msec loop iteration period, during the base station transmit portion of the TDD signal and generates an error output which is computed as:

error=$k*(E-L)$.

The pull-in mode PN phase discriminator 224 operates prior to TDD synchronization within the CT-2 circuitry; in order to avoid incorporating measurements taken when the TDD signal is absent, i.e.. where the duty cycle is less than 100% and nominally about 50%, this discriminator takes three pairs of early/late measurements during each 2-msec TDD period, the measurement pairs (E1,L1), (E2,L2), and (E3,L3) being separated by ⅔ msec, and computes the error estimate, at 500 Hz, as:

E=max (E1,E2,E3)

L=max (L1,L2,L3)

error=$k*(E-L)$

All (E,L) measurement pairs are taken over adjacent PN sequence periods, thus the measurements of each pair are separated in time by one PN sequence length, or ⅑ msec.

The standby mode PN phase discriminator 228 used during low-duty-cycle tracking provides an extended range of linear operation by employing not just two signal strength measurements (E and L) separated by 2*dT, but seven such measurements (M[i], for i=−3 to 3), taken in half-chip increments from 1.5 chips early to 1.5 chips late relative to nominal. This discriminator 228 provides a linear range of 3.0 chips (−1.5 to +1.5 chips, relative to nominal) by computing the error as:

imax=i: M[i]≧M[j], for all −2≦i, j≦2 error=$imax/2+k*(M[imax-1]-M[imax+1])$.

In other words, these steps comprise:
determining, as output of a low-duty cycle, extended-range delay-lock-loop discriminator, a weighted additive combination of:
the difference between the sample values on either side of the maximum RSSI value; and
the difference of said index of location of the maximum RSSI value from the nominal phase.

These sets of expressions represent the operation of an extended range tracking loop and discriminator capable of taking into account both frequency drift and drift rate while consuming only a minimal amount of power. The second-order delay-lock loop 230 is used for pull-in and for normal tracking, and the third-order delay lock loop 232 is used for low-operating duty-cycle tracking in the preferred embodiment. The second-order loop is used to track the PN frequency offset, as well as the phase offset, between the local reference and the incoming signal; the third-order loop is used to track the PN frequency drift rate, as well as the phase and frequency offsets, between the local reference and the incoming signal.

During pull-in, which lasts typically 0.5 seconds or until the CT-2 circuitry has achieved TDD synchronization, whichever occurs last in the preferred embodiment, the loop gain constants are set for a loop bandwidth of 40 Hz and a damping factor of 2.0; the loop is iterated at 500 Hz.

During normal tracking, which is any time after pull-in when the handset is not in standby mode, the loop gain constants are set for a loop bandwidth of 1 Hz and a damping factor of 1.0. It is iterated preferably at 20 Hz.

During low-duty-cycle tracking, which is during the stand-by mode, the loop gain constants are set for a loop bandwidth of 0.07 Hz and a damping factor of 1.0. The loop is preferably iterated each 2.048 seconds (0.488 Hz).

Figure 3:
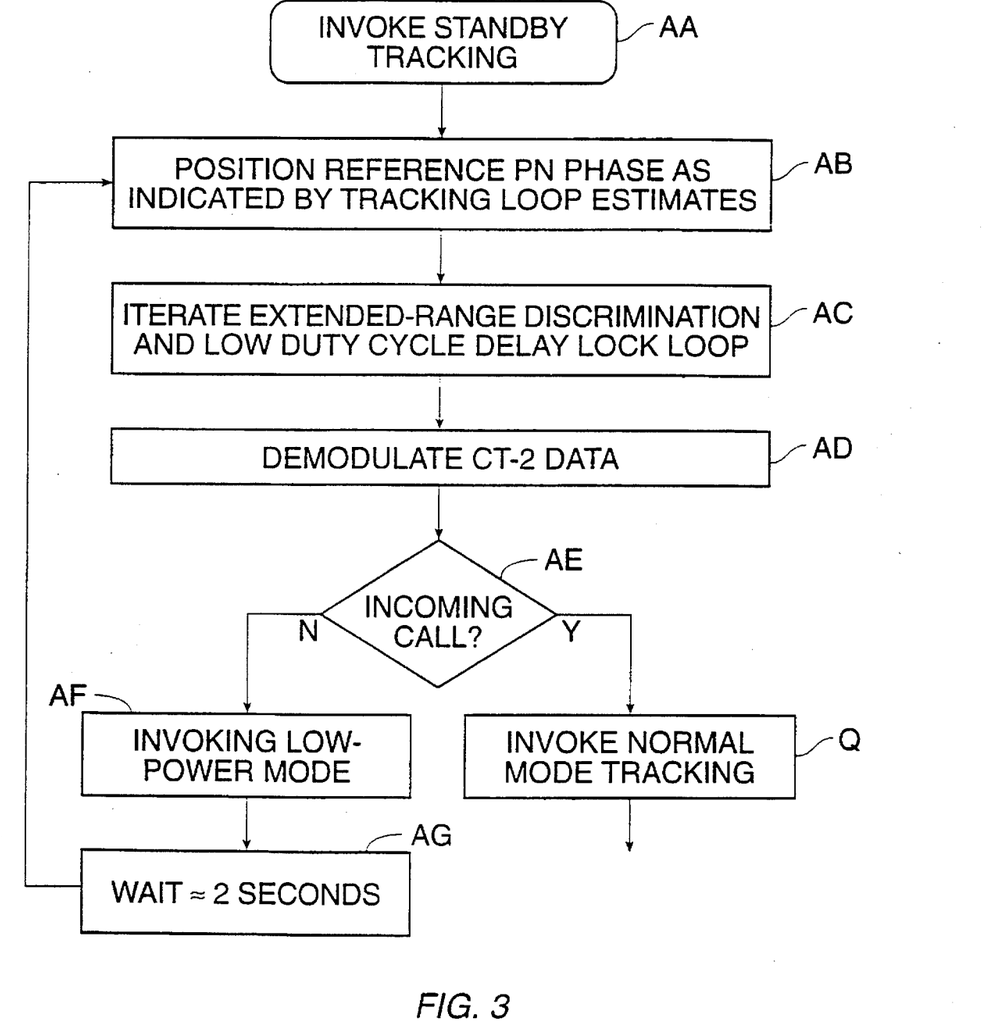
FIG. 3 is a flow chart of the stand-by tracking mode.

FIG. 3 is a flow chart which illustrates operation of standby tracking mode, which is used for low operating duty-cycle tracking to achieve extended range linear operation and to save power without risking loss of incoming calls. When the standby tracking mode is invoked (Step AA), the phase of the reference PN sequence is positioned as indicated by tracking loop estimates (Step AB). The extended range discriminator/low-duty-cycle DLL is iterated (Step AC), and the CT-2 data is demodulated by the CT-2 processor (Step AD). If no incoming call is detected from the CT-2 data (Step AE), the processor enables the energy-saving low-power mode (Step AF), waits a relatively long interval (2.048 sec in a preferred embodiment (Step AG) and repositions the phase of the reference PN sequence (Step AB). If an incoming call is detected in the CT-2 data (Step AE), the normal tracking mode is invoked (Step Q).

Figure 6:
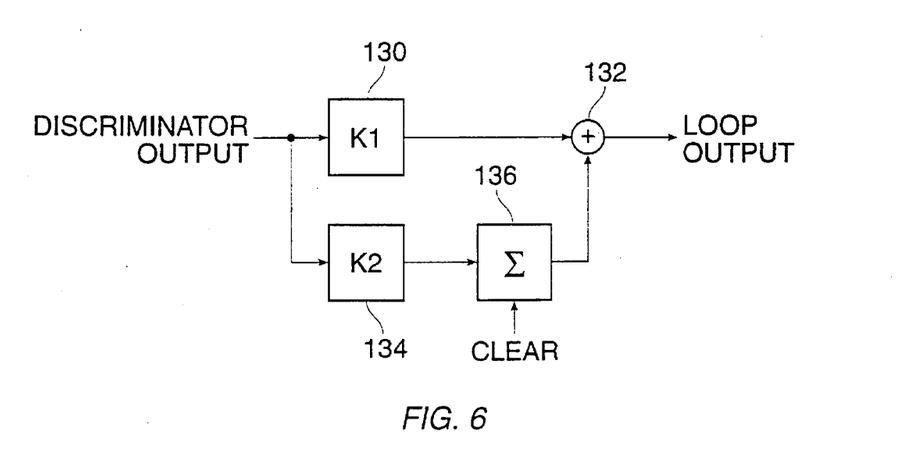
FIG. 6 is functional block diagram of a second-order delay-lock loop discriminator.

FIG. 6 illustrates a second-order delay-lock loop of the type used in both the pull-in mode and the normal tracking mode. A first gain element 130 is coupled to an adder 132 coupled in parallel to a second gain element 134 feeding an accumulator (adder/register) 136 coupled to the adder 132.

Figure 7:
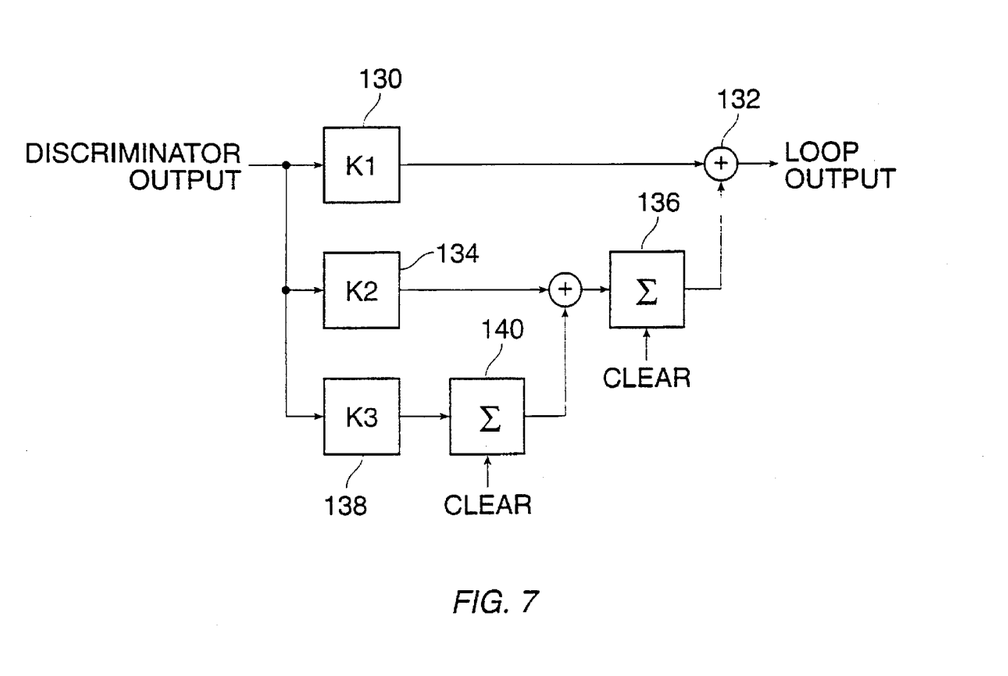
FIG. 7 is functional block diagram of a third-order delay-lock loop discriminator.

In FIG. 7 standby mode tracking is realized as a third gain element 138 coupled in parallel to the first and second gain elements 130, 134 and feeds a second accumulator (adder/register) 140 which in turn feeds into adder 133 coupled to feed first accumulator 136.

FIG. 8 illustrates the signal characteristics of three types of delay-lock-loop discriminators in three timing diagrams in accordance with the invention. Where early and late measurements are made at offsets of ±½ chip phase offset from nominal, the detected signal 200 has alternating peaks 202, 204 which form a sawtooth with the error range 206 between segments (track a). Where early and late measurements are offset only ±⅛ chip about the nominal, the error range 208 of the discriminator output is accordingly limited (track b). The error range 212 of a low-duty-cycle tracker signal extends linearly between for example ±1.5 chips, where sampling is each ½ chip over seven samples (track c).

Thus far, acquisition, pull-in and two modes of tracking have been described at the portable handset. The corresponding base unit must also acquire and track the signal transmitted by the portable handset. Initial acquisition at the base unit is similar to that at the portable handset, except that the search is conducted over a much narrower uncertainty range, and only in the receive portion of the TDD waveform, since the base station defines the timing for the system and no portable handset would ever transmit until it had already synchronized with the system timing. Thus, acquisition is similar to the previously described acquisition with acquisition activity occurring only during base station receive intervals. Pull-in and tracking at the base station are likewise simplified. Pull-in is not needed. The tracking loop need only be first order and the base station need not track frequency offset. There is also no standby mode tracking since the need to conserve power does not exist with a base station.

The invention has now been explained with reference to specific embodiments. Other embodiments will be apparent to those of ordinary skill in the art. For example, the invention is not specifically limited to use only in the CT-2 environment. It is therefore not intended that this invention be limited, except as indicated by the appended claims.

What is claimed is:

1. In a digital cordless telephone system, a battery-operated handset for use in conjunction with a compatible base station unit, said handset comprising:

a modular controller means, said controller means including memory, a central processor unit, a transmit signal output for a transmit signal, a receive signal input for receiving a receive signal, a receive signal strength indicator (RSSI) input for receiving an RSSI signal, a control output for controlling a pseudo-random number generator/decoder means, an audio signal input and an audio signal output;

a pseudo-random number generator means coupled to said controller means, for generating a transmit pseudo-random-noise (PN) bit sequence and a receive pseudo-random-noise (PN) bit sequence for use in spread spectrum coding and decoding;

first digital signal modulator means coupled to receive said transmit pseudo-random-noise bit sequence and said transmit signal to produce a direct sequence spread-spectrum-modulated signal;

upconverting and transmitting means for producing an output spread spectrum analog r.f. signal in a first preselected spread spectrum frequency channel;

receiving means for receiving an input spread spectrum analog r.f. signal in a second preselected spread spectrum frequency channel;

downconverting means for said input spread spectrum analog r.f. signal to produce an intermediate spread spectrum signal;

second digital signal modulator means coupled to receive said receive pseudo-random-noise bit sequence and a fixed oscillator signal to produce a spread-spectrum-demodulated signal;

third digital modulator means coupled to receive said spread-spectrum-demodulated signal and said intermediate spread spectrum signal operative as a despreader to produce a despread receive signal and to produce an RSSI signal;

means coupling said RSSI signal to said controller means;

means for integrating said RSSI signal over a preselected time window of integration to produce a time-integrated RSSI signal;

means for converting said time-integrated RSSI signal to a digital time-integrated RSSI signal; and signal processing means coupled to receive said time-integrated RSSI signal, to control said integrator means and to control said second digital modulator means for regulating relative phase of said time window of integration for acquiring, pulling-in and tracking said receive spread-spectrum signal.

2. The apparatus according to claim 1 wherein said first spread spectrum frequency channel and said second spread spectrum frequency channel are of the same frequency and wherein said upconverting and transmitting means operates in time-division duplex (TDD) with said receiving means and said downconverting means.

3. The apparatus according to claim 1 wherein said transmit signal and said receive signal are modulated for time-division duplex (TDD) access, and wherein said signal processing means comprises a delay-lock-loop discriminator.

4. The apparatus according to claim 1 wherein said signal processing means includes means for acquiring a TDD signal from said base station unit and upon acquiring of said TDD signal invoking a pull-in mode and thereafter a normal tracking mode of said TDD signal.

5. The apparatus according to claim 4 wherein said TDD signal has frame of less than 100% duty cycle and wherein said signal processing means in said pull-in mode is operative to sample said TDD signal in three pairs at intervals substantially evenly spaced over a frame, said pairs being of not more than ±½ chip separation relative to a nominal phase position.

6. The apparatus according to claim 5 wherein sample pairs are spaced not more than ±⅛ chip separation.

7. The apparatus according to claim 4 wherein said TDD signal has frame of less than 100% duty cycle and wherein said signal processing means in said normal tracking mode is operative to sample said TDD signal in three pairs at intervals substantially evenly spaced over a frame, said pairs being of not more than ½ chip separation relative to a nominal phase position.

8. The apparatus according to claim 5 wherein sample pairs are spaced not more than ±⅛ chip separation.

9. The apparatus according to claim 4 wherein said signal processing means includes means for invoking a standby tracking mode to save power, said standby tracking mode employing a third-order delay lock loop operating with a low operating duty cycle.

10. In a digital cordless telephone system having a battery-operated handset for use in conjunction with a compatible base station unit, the handset including a modular controller means, a pseudo-random number generator/decoder means coupled to said controller means for generating a transmit pseudo-random-noise (PN) bit sequence and a receive pseudo-random-noise (PN) bit sequence for use in spread spectrum coding and decoding, a method in said handset for receiving signals from said base station unit comprising:

b) in a signal pull-in mode following an indication of a valid signal on a signal channel, said valid signal of less than 100% duty cycle in a time frame, b-i) sampling in three pairs at intervals substantially evenly spaced over a frame, said pairs being of a PN code phase offset which is a fraction of a chip separation relative to a nominal phase position;

b-ii) selecting among early samples the early sample having maximum value and among late samples the late sample having maximum value;

b-iii) determining as an error value from a delay-lock-loop discriminator the difference between the maximum value early sample and the maximum value late sample;

b-iv) iterating a tracking loop and adjusting phase offset of a local PN bit sequence relative to a matching PN bit sequence on the signal channel as steered by output of said tracking loop; and b-v) repeating steps b-i) through b-iv) to maintain tracking.

11. The method according to claim 10 wherein said delay-lock-loop discriminator is employed with second-order loop tracking.

12. The method according to claim 10 wherein said PN code phase offset is not more than ±½ chip relative to nominal phase.

13. In a digital cordless telephone system having a battery-operated handset for use in conjunction with a compatible base station unit, the handset including a modular controller means, a pseudo-random number generator/decoder means coupled to said controller means for generating a transmit pseudo-random-noise (PN) bit sequence and a receive pseudo-random-noise (PN) bit sequence for use in spread spectrum coding and decoding, a method in said handset for receiving signals from said base station unit comprising:

c) in a normal signal tracking mode following an indication of a valid signal on a signal channel, said valid signal having less than a 100% duty cycle in a time frame,     c-i) sampling, at a fractional chip of PN code phase offset, signal values for an early value and a late value relative to nominal phase of said valid signal in the time frame;

c-ii) determining as an error value from a delay-lock-loop discriminator the difference between the early value and late value;

c-iii) iterating a tracking loop and adjusting said PN code phase offset relative to a matching PN bit sequence on the signal channel as steered by output of said tracking loop; and     c-iv) repeating steps c-i through c-iii) to track the signals.

14. The method according to claim 13 wherein said delay-lock-loop discriminator is employed with second-order loop tracking.

15. The method according to claim 13 wherein said PN code phase offset is not more than ±½ chip relative to nominal phase.

16. In a digital cordless telephone system having a battery-operated handset for use in conjunction with a compatible base station unit, the handset including a modular controller means, a pseudo-random number generator/decoder means coupled to said controller means for generating a transmit pseudo-random-noise (PN) bit sequence and a receive pseudo-random-noise (PN) bit sequence for use in spread spectrum coding and decoding, a method in said handset for receiving signals from said base station unit comprising:

d) in a standby signal tracking mode following an indication of a valid signal on a signal channel, said valid signal having less than a 100% duty cycle in a time frame,     d-i) comparing a local PN bit sequence with reception on a signal channel for presence of a matching PN bit sequence about a nominal phase to yield a current received signal strength indication (RSSI) value;

d-ii) comparing said current RSSI value with a current maximum RSSI value;

d-iii) upon said current RSSI value exceeding said current maximum RSSI value, substituting said current RSSI value for said current maximum RSSI value, saving an index of location of said then current maximum RSSI value;

d-iv) incrementing phase of said local PN bit sequence relative to phase of said received signal by a fraction of a chip in phase; thereupon     d-v) repeating steps d-i) through d-iv) for a number of intervals not substantially exceeding a PN code phase uncertainty width of a low-operating duty-cycle discriminator;

d-vi) determining an output of a low-duty cycle, extended-range delay-lock-loop discriminator;

d-vii) iterating said delay-lock loop discriminator and adjusting phase offset of a local PN bit sequence relative to a matching PN bit sequence on the signal channel as steered by said error value;

d-viii) repeating steps d-i) through d-vii) until an incoming call is detected or a call is originated.

17. The method according to claim 16, wherein said determining step d-vi) comprises adding a weighted combination of:

the difference between the sample values on either side of the maximum RSSI value; and the difference of said index of location of the maximum RSSI value from the nominal phase.

18. The method according to claim 16 wherein said delay-lock-loop discriminator is employed with a third-order loop.

\* \* \* \* \*